United States Patent
Ranjan et al.

(10) Patent No.: US 11,902,181 B1
(45) Date of Patent: Feb. 13, 2024

(54) ACTION FIRST PERMISSION MANAGEMENT SYSTEM IN CLOUD COMPUTING

(71) Applicant: International Business Machines Corporation, Armonk, NY (US)

(72) Inventors: Paritosh Ranjan, Kolkata (IN); Lamogha Chiazor, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/194,661

(22) Filed: Apr. 3, 2023

(51) Int. Cl.
  G06F 13/00 (2006.01)
  H04L 47/70 (2022.01)
  H04L 47/762 (2022.01)

(52) U.S. Cl.
  CPC .......... H04L 47/821 (2013.01); H04L 47/762 (2013.01); H04L 47/827 (2013.01)

(58) Field of Classification Search
  CPC .... H04L 47/821; H04L 47/762; H04L 47/827
  USPC .......... 709/226, 225, 201, 217–219
  See application file for complete search history.

(56) References Cited

U.S. PATENT DOCUMENTS

| | | | |
|---|---|---|---|
| 9,300,633 B2 | 3/2016 | Acharya | |
| 9,679,148 B2 | 6/2017 | Faitelson | |
| 10,075,442 B2 | 9/2018 | Simpson | |
| 11,727,286 B2 * | 8/2023 | Hazard | G06N 20/00 706/12 |
| 2012/0110650 A1 | 5/2012 | Van Biljon | |
| 2014/0317701 A1 | 10/2014 | Eicken | |
| 2021/0312307 A1 * | 10/2021 | Hazard | G06N 20/00 |
| 2021/0326652 A1 * | 10/2021 | Hazard | G06N 5/045 |
| 2023/0046874 A1 * | 2/2023 | Hazard | G06N 20/00 |
| 2023/0091954 A1 * | 3/2023 | Rommel | G06F 9/4887 |

FOREIGN PATENT DOCUMENTS

| CN | 104052747 A | 9/2014 |
|---|---|---|
| EP | 3271857 B1 | 4/2020 |

OTHER PUBLICATIONS

Kesarwani et al., "Development of trust based access control models using fuzzy logic in cloud computing", Journal of King Saud University—Computer and Information Sciences, ScienceDirect, Accepted Nov. 3, 2019, 11 pages.

* cited by examiner

*Primary Examiner* — Kenneth R Coulter
(74) *Attorney, Agent, or Firm* — Edward P. Li (57) ABSTRACT

A computer-implemented method, a computer program product, and a computer system for managing permissions in cloud computing. A computer detects n times of attempts of an action in cloud computing, where the n times of attempts are initiated by a user who has no permission to perform the action, where n is a predetermined number triggering generation of a request for a permission to perform the action. A computer generates the request for the permission for the user. A computer determines whether the request has been pre-approved. In response to determining that the request has been pre-approved, a computer automatically approves the request. In response to determining that the request has not been pre-approved, a computer adds metadata about the user to the request and sends the request with the metadata to a cloud administrator, where the cloud administrator approves or denies the request based on the metadata.

20 Claims, 3 Drawing Sheets

ACTION FIRST PERMISSION MANAGEMENT SYSTEM IN CLOUD COMPUTING

BACKGROUND

The present invention relates generally to management of cloud computing and more particularly to management of action first permissions for cloud resources.

An existing permission management system in cloud computing allows permissions to be granted to cloud users by guessing or intelligently calculating the permissions. Once the permissions are granted to the cloud user, the permissions are either over-granted or under-granted. This leads to an unoptimized permission management system which creates several problems in cloud operations and harms business from multiple perspectives including but not limited to service disruptions, delays in deadlines, security incidents, data breaches, etc.

In some cases, a cloud user is incorrectly granted several dangerous permissions even without the cloud user's requesting for permission to perform an action. The cloud user sometimes accidently performs an action that the cloud user is not supposed to perform, resulting in cloud resource deletion, over provisioning, or unintended configuration change, all eventually damaging the business.

In other cases, the cloud user faces difficulty in performing cloud actions due to under-granted permissions, because a cloud administrator finds it difficult to figure out and grant an exact set of permissions that the cloud user needs. This results in delays in cloud operations, thus resulting in delays in deadlines and decrease in overall quality.

SUMMARY

In one aspect, a computer-implemented method for managing permissions in cloud computing is provided. The computer-implemented method includes detecting n times of attempts of an action in cloud computing, wherein the n times of attempts are initiated by a user who has no permission to perform the action, wherein n is a predetermined number triggering generation of a request for a permission to perform the action. The computer-implemented method further includes generating the request for the permission for the user, in response to the n times of attempts. The computer-implemented method further includes determining whether the request has been pre-approved. The computer-implemented method further includes, in response to determining that the request has been pre-approved, automatically approving the request and allowing the user to perform the action. The computer-implemented method further includes, in response to determining that the request has not been pre-approved, adding metadata about the user to the request and sending the request with the metadata to a cloud administrator, wherein the cloud administrator approves or denies the request based on the metadata.

In another aspect, a computer program product for managing permissions in cloud computing is provided. The computer program product comprises a computer readable storage medium having program instructions embodied therewith, and the program instructions are executable by one or more processors. The program instructions are executable to: detect n times of attempts of an action in cloud computing, wherein the n times of attempts are initiated by a user who has no permission to perform the action, wherein n is a predetermined number triggering generation of a request for a permission to perform the action; generate the request for the permission for the user, in response to the n times of attempts; determine whether the request has been pre-approved; in response to determining that the request has been pre-approved, automatically approve the request and allow the user to perform the action; in response to determining that the request has not been pre-approved, add metadata about the user to the request and sending the request with the metadata to a cloud administrator, wherein the cloud administrator approves or denies the request based on the metadata.

In yet another aspect, a computer system for managing permissions in cloud computing is provided. The computer system comprises one or more processors, one or more computer readable tangible storage devices, and program instructions stored on at least one of the one or more computer readable tangible storage devices for execution by at least one of the one or more processors. The program instructions are executable to detect n times of attempts of an action in cloud computing, wherein the n times of attempts are initiated by a user who has no permission to perform the action, wherein n is a predetermined number triggering generation of a request for a permission to perform the action. The program instructions are further executable to generate the request for the permission for the user, in response to the n times of attempts. The program instructions are further executable to determine whether the request has been pre-approved. The program instructions are further executable to automatically approve the request and allow the user to perform the action, in response to determining that the request has been pre-approved. The program instructions are further executable to add metadata about the user to the request and sending the request with the metadata to a cloud administrator, in response to determining that the request has not been pre-approved, wherein the cloud administrator approves or denies the request based on the metadata.

DETAILED DESCRIPTION

Embodiments of the present invention disclose a method and system for solving problems of over-granted or under-granted permissions. The method and system solve the problems in an optimized, automatically calculated, and fast manner. Embodiments of the present invention disclose an intelligent workflow system—an action first permission management system in cloud computing. The action first permission management system improves a process of initiating and approving requests in existing cloud management systems. The action first permission management system saves time for both the cloud account users and cloud administrators, because the action first permission management system does not need manually requesting and/or approving permissions for certain actions.

The disclosed method and system automatically generate requests for permissions for cloud users to use cloud services. The automatic generation of the requests is based on actions of the cloud user, as opposed to the manual generation of the requests by the cloud users. The disclosed method and system automatically approve on behalf of cloud administrators, based on available information on user's access rights. The disclosed method and system assist cloud administrators with easily auditing actions and approved requests.

In the disclosed method and system, the automatic permission request generation is configured to be triggered only after the nth retry or attempt of an action or operation by a cloud user; therefore, the permission requests are not generated by mistake. In addition, the action first permission management system prompts the cloud user to confirm whether the cloud user is interested in generating permission request after the nth retry to perform the action or operation.

In the disclosed method and system, when a cloud user retries or attempts a cloud operation for n times, a cloud client or a cloud server (e.g., the action first permission management system) obtains consent from the cloud user and then generates a request for permission to perform the cloud operation. In one scenario, the request is automatically approved after checking a pre-approved permission datastore which contains the list of pre-approved permissions for cloud users of a cloud account. In another scenario, information from the pre-approved permission datastore is added as request metadata and presented to a cloud administrator, so that the cloud administrator can decide accordingly.

For example, if a cloud user tries to provision a virtual machine for n times without having a permission to provision virtual machines in a cloud account, the cloud client generates a request for a permission to provision virtual machines and sends the request to the action first permission management system. The action first permission management system queries the pre-approved permission datastore to check whether the cloud user has a pre-approved permission to create virtual machines. If the pre-approved permission to create virtual machines is found in the datastore, then the action first permission management system automatically approves the request for the cloud user.

The disclosed method and system lead to optimization of permissions granted in a cloud environment. The permissions are granted strictly on action backed need basis, leading to complete protection from problems related to over-granted permissions. The disclosed method and system also speed up the process of identifying and approving a correct set of required permissions to perform cloud operations thus reducing delays due to lack of permissions.

Figure 1:
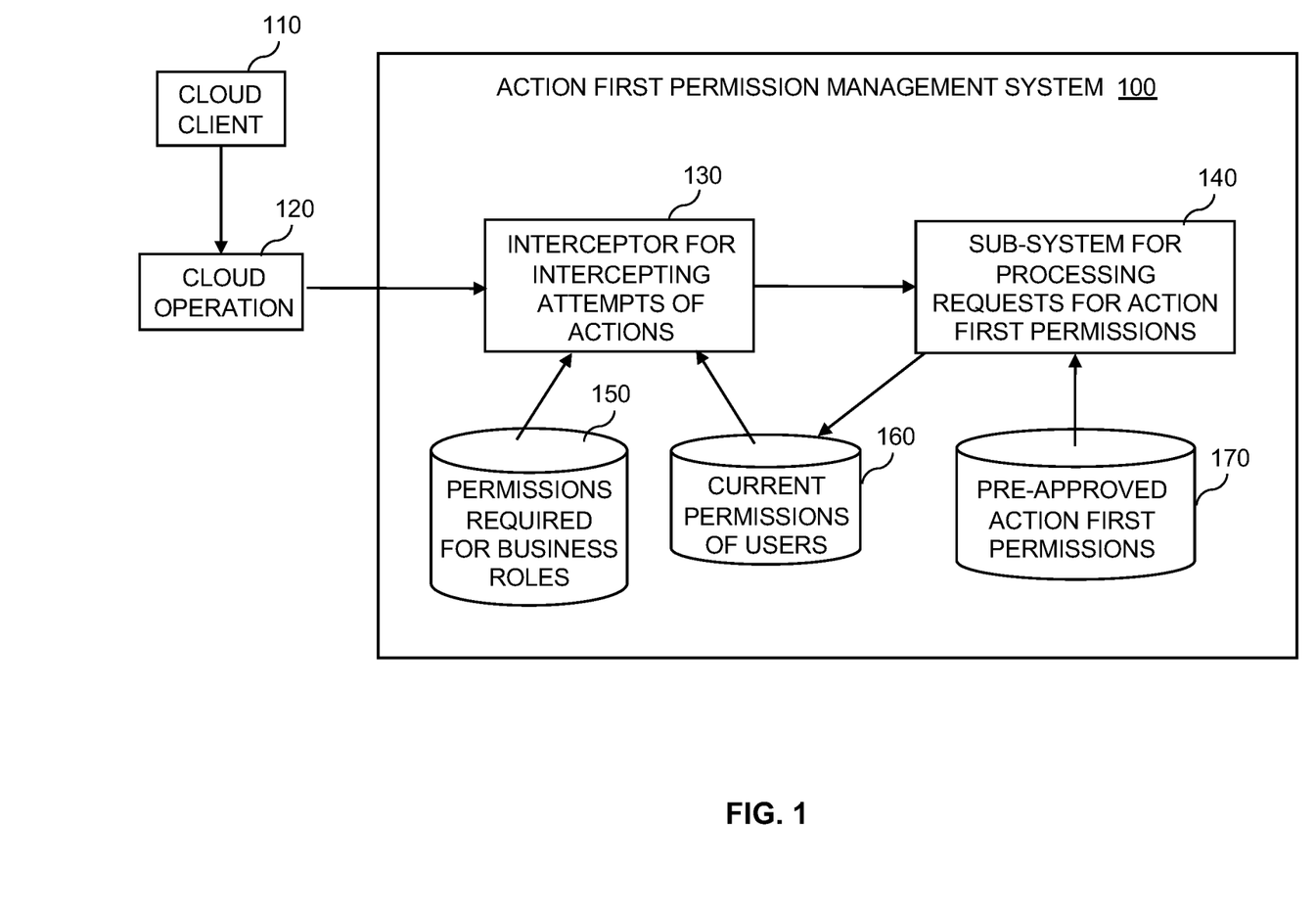
FIG. 1 illustrates an action first permission management system in cloud computing, in accordance with one embodiment of the present invention.

FIG. 1 illustrates action first permission management system 100 in cloud computing, in accordance with one embodiment of the present invention. Action first permission management system 100 is situated on a computer or server (such as computer 301 in FIG. 3). Action first permission management system 100 includes components, such as interceptor 130 for intercepting attempts of actions, sub-system 140 for processing requests for action first permissions, datastore 150 storing permissions required for business roles, datastore 160 storing current permissions of users, and datastore 170 storing pre-approved action first permissions.

When a cloud user, who has no permission to perform cloud operation 120, retries or attempts cloud operation 120 for n times (where n is a predetermined number), cloud client 110 obtains consent from the cloud user and then generates a request for a permission to perform cloud operation 120. The request for the permission can be configured to be generated after the nth attempt so that permission requests are not generated by mistake. In other embodiments, obtaining the consent and generating the request may be implemented by a cloud server.

Interceptor 130 intercepts any attempt to access a cloud resource by a cloud user. The cloud user uses cloud client 110 to access the resource through cloud operation 120. For example, cloud client 110 may be a command-line interface (CLI) client, a user interface (UI) client, or an application programming interface (API) client. Interceptor 130 determines whether the cloud user who attempts to access the cloud resource has an authorization to access the cloud resource; to do so, interceptor 130 checks datastore 150 storing permissions required for business roles and datastore 160 storing current permissions of users. Datastore 150 and datastore 160 are part of an identity and access management (IAM) system.

Datastore 150 storing permissions required for business roles stores a minimum level of required permissions, i.e., a minimum level of roles required by any resource; for example, in cloud computing, a reader role is needed to read from a database in an SaaS (software as a service) instance, an admin role is needed to delete in a database in an SaaS instance, and a manager role is needed to increase the size of a database in an SaaS instance. Datastore 160 storing current permissions of users stores information of permissions which the cloud user currently has, including current permissions to access respective resources and roles in operating the respective resources.

After checking datastore 150 and datastore 160, in response to determining that the cloud user has a permission or authorization to perform cloud operation 120, interceptor 130 allows the cloud user to perform cloud operation 120. However, in response to determining that the cloud user does not have a permission or authorization to perform cloud operation 120, interceptor 130 forwards the request generated by cloud client 110 to sub-system 140 for processing requests for action first permissions.

Sub-system 140 processes a request for an action first permission to perform an action. Sub-system 140 may approve, delete, remove, archive, or reject a request generated by cloud client 120. Upon receiving the request forwarded from interceptor 130, sub-system 140 checks datastore 170 storing pre-approved action first permissions. Datastore 170 may be, for example, a database, an Excel sheet, JSON (JavaScript Object Notation), text, etc. Datastore 170 is used to store a list of approved permissions for every cloud user of a cloud account. Datastore 170 also has information on how long a cloud user is approved for a permission. Each of the pre-approved action first permissions in datastore 170 contains the metadata about cloud users. The metadata can be, for example, user's past behavior, things to check before approving the request, or any other information regarding permissions for requested resources and roles.

Sub-system 140 has a feature of automatically approving the request. If the feature is enabled, sub-system 140 can automatically approve the request which is generated by cloud client 110. After checking datastore 170, in response to determining that the request has been pre-approved, sub-system 140 automatically proves the request for the action first permission. Upon automatically approving the request, sub-system 140 stores the automatically approved request in datastore 160. However, in response to determining that the request has not been pre-approved, sub-system 140 adds the metadata (which is stored in datastore 170) to the request and sends to an administrator of a cloud account the request with the added metadata. The administrator may approve or deny the request, based on received metadata with the request.

Sub-system 140 periodically (e.g., daily) checks to make sure that automatically approved requests which have time constraints are automatically revoked after the automatically approved requests expire.

Sub-system 140 periodically (e.g., daily) notifies the administrator of the automatically approved requests and automatically revoked permissions, so that the administrator can audit current permissions of the cloud user. The administrator may initiate an audit of pre-approved action first permissions stored in datastore 170. The administrator may revoke the automatically approved requests.

For controlled use, action first permission management system 100 is kept disabled for cloud users by default. Action first permission management system 100 can be enabled by a cloud account administrator or any cloud user when required; however, and action first permission management system 100 is disabled later.

Action first permission management system 100 can be enabled only for responsible cloud users and disabled for irresponsible cloud users. The responsible cloud users are users who only try to access resources they sincerely and judiciously need to perform cloud operations. The irresponsible cloud users are users who unnecessarily keep trying to access resources without any real need of those to perform cloud operations. Action first permission management system 100 can be enabled or disabled by an administrator of a cloud account.

The maximum number of requests for action first permissions that can be generated for a cloud user is specified by an administrator of a cloud account. After reaching the maximum number, either the cloud user or the administrator has to clean some of the generated requests; otherwise, the administrator has to increase the maximum number so that more requests can be generated by action first permission management system 100 or cloud client 110. In addition, action first permission management system 100 discards any duplicated request generated for the cloud user.

Figure 2:
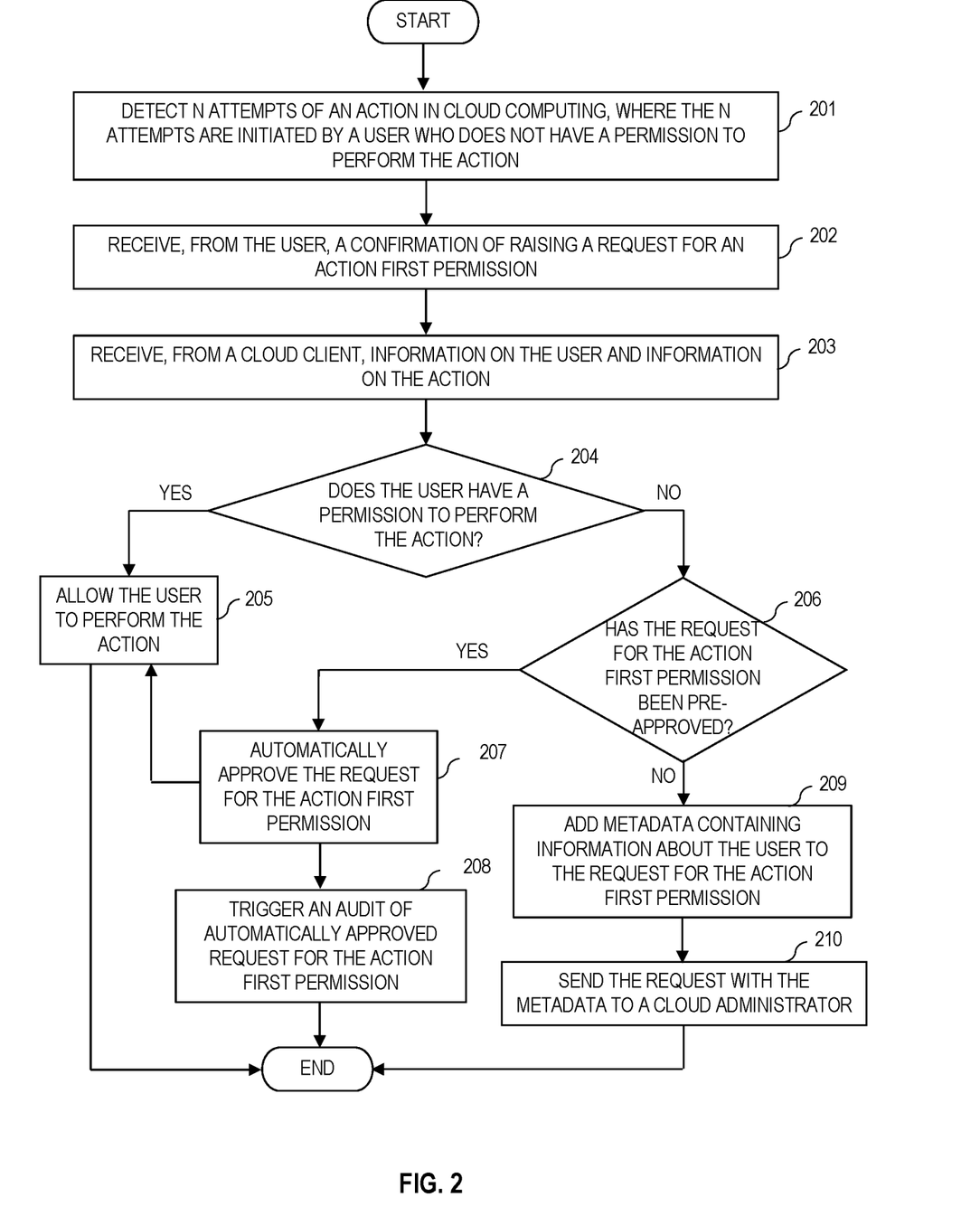
FIG. 2 is a flowchart showing operational steps of management of action first permission for cloud resources, in accordance with one embodiment of the present invention.

FIG. 2 is a flowchart showing operational steps of management of action first permission for cloud resources, in accordance with one embodiment of the present invention. The operational steps are implemented by a permission management system (such as action first permission management system 100 shown in FIG. 1) which is situated on a computer or server (such as computer 301 in FIG. 3).

In step 201, the computer or server detects n attempts of an action in cloud computing, where the n attempts are initiated by a user who does not have a permission to perform the action. The n is a predetermined number that triggers generation of a request for a permission to perform the action. The user retries or attempts the action for n times without a permission. In the example shown in FIG. 1, interceptor 130 in action first permission management system 100 detects the n attempts.

When the user retries or attempts the action for n times without the permission, a request for an action first permission to perform the action is automatically generated. The generation of the request is triggered only after the nth retry or attempt of the action; therefore, the request for the action first permission is not generated by mistake. A cloud client (e.g., cloud client 110 in FIG. 1) or a cloud server (e.g., action first permission management system 100 in FIG. 1) obtains consent from the user and then generates the request for the action first permission.

In step 202, the computer or server receives, from the user, a confirmation of raising the request for an action first permission. In the example shown in FIG. 1, interceptor 130 in action first permission management system 100 receives the confirmation of raising the request.

In step 203, the computer or server receives, from the cloud client, information on the user and information on the action. For example, the information on the user includes details of logging in the cloud client by the user. For example, the information on the action include the type of the action attempted by the user and one or more specific resources attempted by the user. In the example shown in FIG. 1, interceptor 130 in action first permission management system 100 receives the confirmation of raising the request.

In step 204, the computer or server determines whether the user has a permission to perform the action. To determine whether the user has the authorization to perform the action, the computer or server checks a datastore storing permissions required for business roles and a datastore storing current permissions of users. In the example shown in FIG. 1, interceptor 130 inquiries datastore 150 storing permissions required for business roles and datastore 160 storing current permissions of users.

In response to determining that the user has the permission to perform the action (YES branch of decision block 204), in step 205, the computer or server allows the user to perform the action. In response to determining that the user does not have the permission to perform the action (NO branch of decision block 204), in step 206, the computer or server determines whether the request for the action first permission has been pre-approved. In the example shown in FIG. 1, in response to determining that the user does not have the permission, interceptor 130 forwards the request for the action first permission to sub-system 140 which is responsible for processing requests for action first permissions. Sub-system 140 checks datastore 170 which stores pre-approved action first permissions to determine whether the request for the action first permission has been pre-approved.

In response to determining that the request for the action first permission has been pre-approved (YES branch of decision block 206), in step 207, the computer or server automatically approves the request for the action first permission. Upon automatically approving the request, in step 205, the computer or server the computer or server allows the user to perform the action. In the example shown in FIG. 1, sub-system 140 which is responsible for processing requests for action first permissions automatically approves the request for the action first permission.

In response to determining that the request for the action first permission has not been pre-approved (NO branch of decision block 206), in step 209, the computer or server adds metadata containing information about the user to the request for the action first permission. The metadata is kept in a datastore (e.g., datastore 170 in FIG. 1) storing the pre-approved action first permissions. The metadata can be, for example, user's past behavior, things to check before approving this request, or any other information regarding permissions for requested resources and roles. In the example shown in FIG. 1, sub-system 140 which is responsible for processing requests for action first permissions adds the metadata to the request for the action first permission.

In step 210, the computer or server sends the request with the metadata to a cloud administrator. The computer or server sends the cloud administrator the request for approval or denial. The cloud administrator approves or denies the request, based on received metadata added to the request.

Following automatically approving the request in step 207, the computer or server, in step 208, triggers an audit of the automatically approved request for the action first permission. The computer or server notifies the cloud administrator of the automatically approved request, so that the cloud administrator can audit the automatically approved request.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 3:
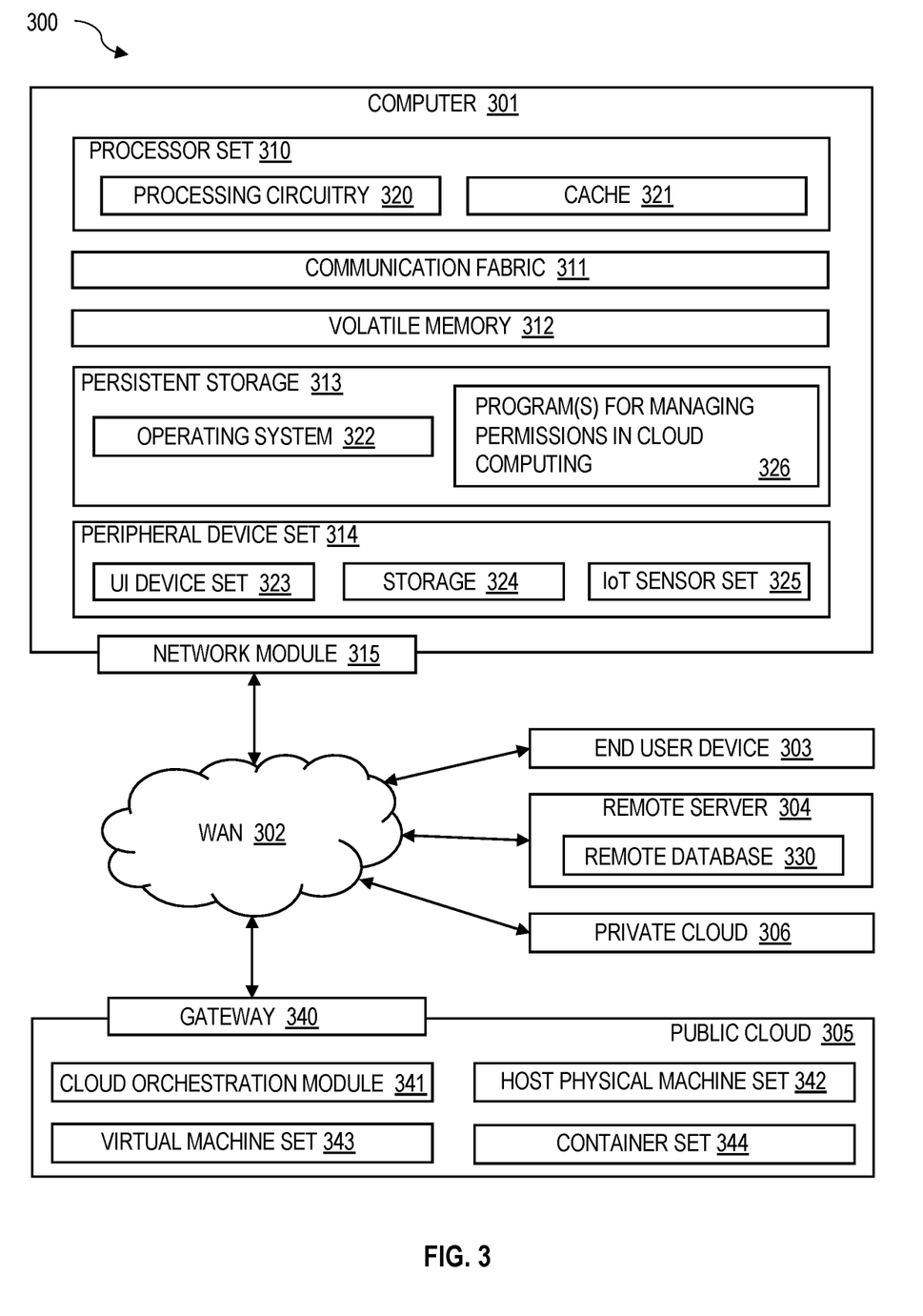
FIG. 3 is a systematic diagram illustrating an example of an environment for the execution of at least some of the computer code involved in performing management of action first permission for cloud resources, in accordance with one embodiment of the present invention.

In FIG. 3, computing environment 300 contains an example of an environment for the execution of at least some of the computer code involved in performing the inventive methods, such as program(s) 326 for managing permissions in cloud computing. In addition to block 326, computing environment 300 includes, for example, computer 301, wide area network (WAN) 302, end user device (EUD) 303, remote server 304, public cloud 305, and private cloud 306. In this embodiment, computer 301 includes processor set 310 (including processing circuitry 320 and cache 321), communication fabric 311, volatile memory 312, persistent storage 313 (including operating system 322 and block 326, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in block 326 in persistent storage 313.

Communication fabric 311 is the signal conduction paths that allow the various components of computer 301 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, the volatile memory is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface type operating systems that employ a kernel. The code included in block 326 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

What is claimed is:

1. A computer-implemented method for managing permissions in cloud computing, the computer-implemented method comprising:
   detecting n times of attempts of an action in cloud computing, wherein the n times of attempts are initiated by a user who has no permission to perform the action, wherein n is a predetermined number triggering generation of a request for a permission to perform the action;
   generating the request for the permission for the user, in response to the n times of attempts;
   determining whether the request has been pre-approved;
   in response to determining that the request has been pre-approved, automatically approving the request and allowing the user to perform the action; and
   in response to determining that the request has not been pre-approved, adding metadata about the user to the request and sending the request with the metadata to a cloud administrator, wherein based on the metadata the cloud administrator approves or denies the request.

2. The computer-implemented method of claim 1, further comprising:
   receiving, from the user, a confirmation of raising the request for the permission; and
   receiving, from a cloud client of the user, information on the user and information on the action.

3. The computer-implemented method of claim 1, further comprising:
   in response to automatically approving the request, triggering an audit of the request for the permission.

4. The computer-implemented method of claim 1, further comprising:
   in response to automatically approving the request, periodically checking the request; and
   automatically revoking the request, in response to the request expiring.

5. The computer-implemented method of claim 1, further comprising:
   notifying the cloud administrator of automatically approved requests and automatically revoked the permissions.

6. The computer-implemented method of claim 1, further comprising:
   for responsible users, enabling the generation of the request for the permission; and
   for irresponsible users, disabling the generation of the request for the permission.

7. The computer-implemented method of claim 1, wherein the cloud administrator sets a maximum number of requests that can be generated for the user for the permissions to perform actions.

8. A computer program product for managing permissions in cloud computing, the computer program product comprising a computer readable storage medium having program instructions stored therewith, the program instructions executable by one or more processors, the program instructions executable to:
   detect n times of attempts of an action in cloud computing, wherein the n times of attempts are initiated by a user who has no permission to perform the action, wherein n is a predetermined number triggering generation of a request for a permission to perform the action;
   generate the request for the permission for the user, in response to the n times of attempts;
   determine whether the request has been pre-approved;
   in response to determining that the request has been pre-approved, automatically approve the request and allow the user to perform the action; and
   in response to determining that the request has not been pre-approved, add metadata about the user to the request and sending the request with the metadata to a cloud administrator, wherein based on the metadata the cloud administrator approves or denies the request.

9. The computer program product of claim 8, further comprising the program instructions stored on the computer readable storage medium, the program instructions executable to:
   receive, from the user, a confirmation of raising the request for the permission; and
   receive, from a cloud client of the user, information on the user and information on the action.

10. The computer program product of claim 8, further comprising the program instructions stored on the computer readable storage medium, the program instructions executable to:
    in response to automatically approving the request, trigger an audit of the request for the permission.

11. The computer program product of claim 8, further comprising the program instructions stored on the computer readable storage medium, the program instructions executable to:
in response to automatically approving the request, periodically check the request; and
automatically revoke the request, in response to in response to the request expiring.

12. The computer program product of claim 8, further comprising the program instructions stored on the computer readable storage medium, the program instructions executable to:
notify the cloud administrator of automatically approved requests and automatically revoked the permissions.

13. The computer program product of claim 8, further comprising the program instructions stored on the computer readable storage medium, the program instructions executable to:
for responsible users, enable the generation of the request for the permission; and
for irresponsible users, disable the generation of the request for the permission.

14. The computer program product of claim 8, wherein the cloud administrator sets a maximum number of requests that can be generated for the user for the permissions to perform actions.

15. A computer system for managing permissions in cloud computing, the computer system comprising one or more processors, one or more computer readable tangible storage devices, and program instructions stored on at least one of the one or more computer readable tangible storage devices for execution by at least one of the one or more processors, the program instructions executable to:
detect n times of attempts of an action in cloud computing, wherein the n times of attempts are initiated by a user who has no permission to perform the action, wherein n is a predetermined number triggering generation of a request for a permission to perform the action;
generate the request for the permission for the user, in response to the n times of attempts;
determine whether the request has been pre-approved;
in response to determining that the request has been pre-approved, automatically approve the request and allow the user to perform the action; and
in response to determining that the request has not been pre-approved, add metadata about the user to the request and sending the request with the metadata to a cloud administrator, wherein based on the metadata the cloud administrator approves or denies the request.

16. The computer system of claim 15, further comprising the program instructions stored on the at least one of the one or more computer readable tangible storage devices, the program instructions executable to:
receive, from the user, a confirmation of raising the request for the permission; and
receive, from a cloud client of the user, information on the user and information on the action.

17. The computer system of claim 15, further comprising the program instructions stored on the at least one of the one or more computer readable tangible storage devices, the program instructions executable to:
in response to automatically approving the request, trigger an audit of the request for the permission.

18. The computer system of claim 15, further comprising the program instructions stored on the at least one of the one or more computer readable tangible storage devices, the program instructions executable to:
in response to automatically approving the request, periodically check the request; and
automatically revoke the request, in response to the request expiring.

19. The computer system of claim 15, further comprising the program instructions stored on the at least one of the one or more computer readable tangible storage devices, the program instructions executable to:
notify the cloud administrator of automatically approved requests and automatically revoked the permissions.

20. The computer system of claim 15, further comprising the program instructions stored on the at least one of the one or more computer readable tangible storage devices, the program instructions executable to:
for responsible users, enable the generation of the request for the permission; and
for irresponsible users, disable the generation of the request for the permission.

* * * * *